United States Patent [19]

Goodfellow

[11] Patent Number: 4,732,640

[45] Date of Patent: Mar. 22, 1988

[54] APPARATUS FOR THE MANUFACTURE OF PNEUMATIC TIRES

[75] Inventor: Anthony G. Goodfellow, Merseyside, England

[73] Assignee: W & A Bates Limited, United Kingdom

[21] Appl. No.: 724,888

[22] Filed: Apr. 19, 1985

[30] Foreign Application Priority Data

May 9, 1984 [GB] United Kingdom ................. 8411820

[51] Int. Cl.⁴ .............................................. B29D 30/08
[52] U.S. Cl. ..................................... 156/396; 156/111
[58] Field of Search ............... 156/111, 126, 396, 502, 156/405.1, 414

[56] References Cited

U.S. PATENT DOCUMENTS

| 2,407,152 | 9/1946 | Haase | 156/396 X |
| 2,818,907 | 1/1958 | Sapp | 156/396 |
| 3,223,573 | 12/1965 | Deist | 156/111 X |
| 3,888,720 | 6/1975 | Habert | 156/405.1 X |
| 3,909,337 | 9/1975 | Yabe | 156/416 X |
| 4,134,783 | 1/1979 | Appleby et al. | 156/405.1 X |
| 4,197,155 | 4/1980 | Hursell, Sr. | 156/396 |
| 4,268,330 | 5/1981 | Komatsu et al. | 156/111 |

FOREIGN PATENT DOCUMENTS

| 8000327 | 3/1980 | PCT Int'l Appl. . |
| 1149722 | 4/1969 | United Kingdom . |
| 1479407 | 7/1977 | United Kingdom . |

Primary Examiner—Donald E. Czaja
Assistant Examiner—Ramon R. Hoch
Attorney, Agent, or Firm—Stevens, Davis, Miller & Mosher

[57] ABSTRACT

Tire building apparatus in which a former is mounted on a first rotatable turret, and a component carrier of tubular form is mounted on a second rotatable turret adjacent the first turret. The former and the component carrier are arranged to be relatively movable at a turret station to enable the former to be surrounded by the component carrier so as to permit transfer of a tire building component between the former and the component carrier.

6 Claims, 1 Drawing Figure

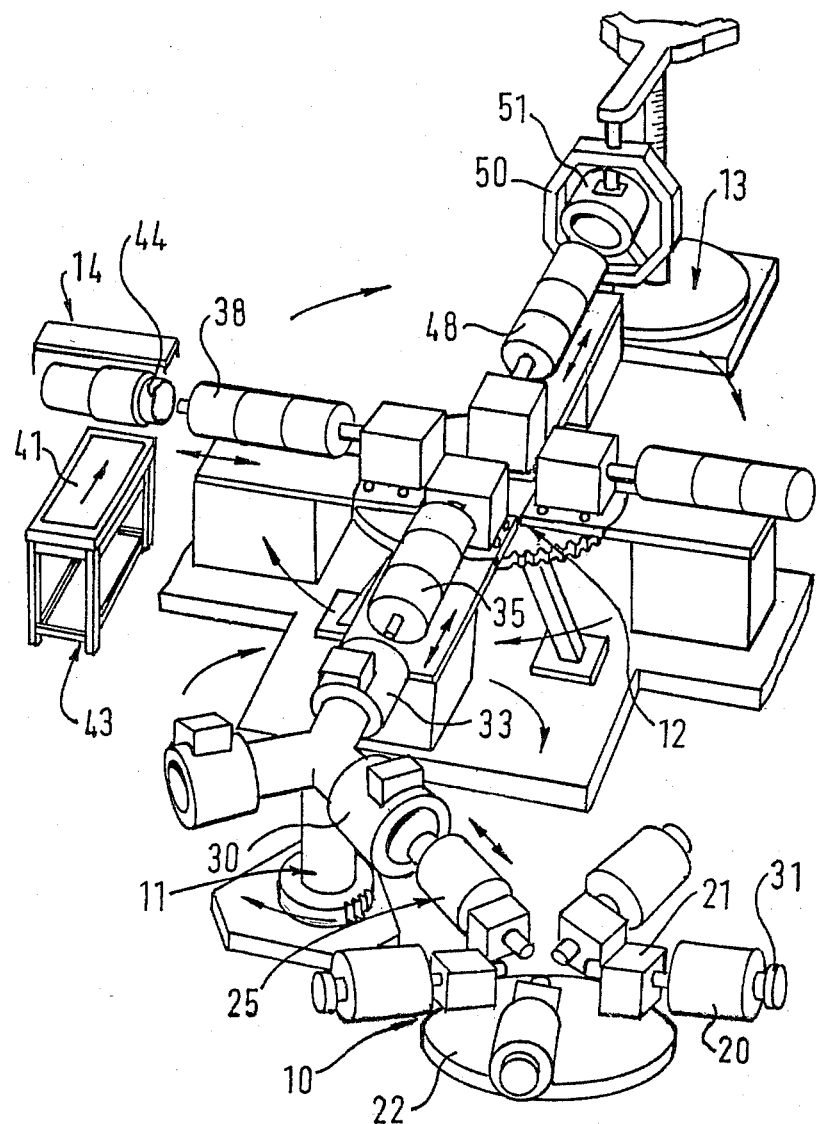

APPARATUS FOR THE MANUFACTURE OF PNEUMATIC TIRES

This invention relates to improvements in the manufacture of pneumatic tires. Particularly where such manufacture is carried out by automatic machinery, it is necessary for tire building material to be applied to tire building fomers, or to formers for the manufacture of tire components, and subsequently for partly-built tires or tire components to be transferred to other formers for subsequent stages of the manufacturing process.

The design of manufacturing plant for pneumatic tires by automatic assembly techniques presents problems in arranging for accurate and rapid transfer of components and partly-built tires from one stage to the next, and it is an object of the present invention to provide apparatus in which such problems are overcome while achieving a compact factory layout.

According to one aspect of the invention, tire building apparatus comprises at least one former arranged to receive a tire building component on its outer periphery, said former being mounted on a first rotatable turrent so as to be movable between at least two turret stations by rotation of the turret, a component carrier being arranged to be located at a turret station and being of tubular form so as to be capable of supporting a component internally of the carrier, the former and the component carrier being relatively movable at the turret station to enable the former to be surrounded by the component carrier so as to permit transfer of a tire building component between the former and the component carrier.

Preferably apparatus in accordance with the invention comprises at least one component carrier mounted on a second rotatable turret so as to be movable between stations of said second rotatable turret, the first and second turrets being arranged in proximity to one another so that said relative movement of a former and a component carrier may be effected at adjoining stations of the two turrets.

A series of turrets may be provided, to enable components to be passed from one turret to another through a number of manufacturing stages of the tire building apparatus.

One embodiment of the invention will now be described, by way of example, with reference to the accompanying drawing which is a diagrammatic perspective view showing tire building apparatus incorporating four adjoining rotatable turrets.

The apparatus shown in the drawing comprises rotatable turrets 10, 11, 12 and 13. An ancillary apparatus 14 is located adjacent the turret 12 for the supply of carcass ply material.

The turret 10 comprises five formers 20 rotatably mounted on drive units 21 carried on a turntable 22 which is rotatable about a vertical axis to bring the formers 20 successively into a turret station 25 adjacent the second rotatable turret 11. The formers 20 are movable along the direction of their axes, i.e. radially with respect to the axis of the turret 10 so that each former 20 when in the turret station 25 may be moved into a position coaxially within a carrier sleeve 30 mounted on the second rotatable turret 11. Sockets 31 are provided at the ends of the formers 20 for engagement with suitable spigots (not shown) located within the sleeves 30 in order to centre and axially locate the formers 20 within the sleeves 30.

In the manufacture of a pneumatic tire, the turret 10 forms part of the apparatus for making inner liners described in greater detail in our co-pending U.S. application Ser. No. 697,243, filed Feb. 1, 1985. In this apparatus unvulcanized rubber strip from a small calender is wound helically around each former 20 to form a continuous layer on its surface to provide an inner lining for the tire to be built. At the transfer station 25, the carrier sleeve 30 is arranged to receive the completed liner on its inner periphery, transfer being effected by expansion of the former 20 (which may be of the inflatable type) and vacuum gripping means may be provided on the interior of the sleeve 30 to enable the liner to be retained in position in the sleeve after it has been transferred.

Following transfer of a liner from the turret 10 to the turret 11, the former 20 is retracted to enable rotation of the respective turrets 10 and 11 to take place and thus being another former 20 into position adjacent another sleeve 30 for the next transfer operation. Simultaneously, the rotation of the turret 11 brings a sleeve 30, containing an inner liner, into the position shown at 33 where it is aligned with a former 35 carried on the rotatable turret 12. The former 35 is axially movable to a position within the carrier sleeve in a similar manner to the former 20, but in this case the subsequent procedure is reversed, the former 35 being expansible, when in an accurately located coaxial position within the sleeve 33, to pick up the inner liner and transfer it to the periphery of the former 35.

On completion of the transfer of the liner to the former 35, the former 35 is retracted and the respective turrets are again rotated to index the formers and sleeves to a new position in which the former 35 now occupies the position shown at 38, where it lies adjacent ancillary apparatus 14 for the supply of carcass ply material in the form of sheets 41 supported on a table 43, this apparatus being described in greater detail in our co-pending U.S. application Ser. No. 764,529, filed Aug. 12, 1985.

In order to effect transfer of the carcass ply material sheet 41, the former 35 is axially moved into the position indicated (partly broken away) at 44, the axial position of the former again being accurately controlled, and the former is rotated to enable the ply material to be wrapped around it. On completion of this operation the former 35 is again retracted to the position shown at 38 and the turrets are again indexed, the former 35 carrying the inner liner and carcass ply material then being brought into the position shown at 48 where it lies adjacent the fourth rotatable turret 13.

The turret 13 carries three frames 50 (only one of which is shown in the drawing), which each support a "bead tube" 51 described in more detail in our co-pending U.S. Pat. No. 4,401,493. In another station of the turret 13, a pair of bead wire assemblies have been applied to the ends of the bead tube 51, and as shown in the drawing the bead tube is ready to receive the former 35 by axial movement from the position 48 to a position coaxially within the bead tube 51. In this position, the former 35 is expanded to bring the carcass ply material into engagement with the bead wire assemblies and the material is turned around the bead wire assemblies by further expansion of the axially outboard ends of the former relative to the bead tube. The former 35 is then contracted and removed from the bead tube, leaving the partly-built tire carcass within the bead tube for subsequent transfer to a shaping former, and the former 35 is retracted to the position shown at 48.

The apparatus illustrated is of course part of a larger assembly of machinery for the automatic manufacture of pneumatic tires, but it is believed that the above description contains sufficient examples of the principles of operation of apparatus in accordance with the invention to enable the invention to be clearly understood. The advantages flowing from the use of apparatus as described include great accuracy in positioning formers and component carriers to enable a tire carcass to be accurately and rapidly built. The apparatus is particularly compact and well suited to automatic operation.

While in the embodiment described above the axis of rotation of each turret is vertical, apparatus in accordance with the invention may alternatively comprise a turret rotatable about a horizontal axis. As in the previously described embodiment, the former may be supported on the turret with its axis disposed radially to the turret axis so that it is movable axially with respect to its own axis and radially with respect to the turret axis, or, in order to preserve a horizontal alignment of the former axis in all angular positions of the turret it may be supported on the turret with its axis parallel to the turret axis. In the latter case, movement of the former into and out of an associated component carrier may not be in a radial direction relative to the axis of the turret, but may take place in a direction transverse to that radial direction.

I claim:

1. A tire carcass building apparatus comprising:
   (i) a first rotatable turret having a plurality of first formers for the manufacture of tire carcass cylindrical inner liners thereon and which are rotatably displaceable between a number of stations;
   (ii) a third rotatable turret having a plurality of second formers for the manufacture of a tire carcass and which are rotatably displaceable between a number of stations,
   (iii) a transfer means for transport of the inner liners from one station on the first rotatable turret to a second station on the third rotatable turret, and which comprises a second rotatable turret with at least three cylindrical transfer sleeves each for supporting a respective cylindrical inner liner on its inner periphery, said transfer sleeves being rotatably displaceable between fixed positions and arranged so that one of the transfer sleeves is in alignment one with said one of the stations of the first turret, and simultaneously, another of the transfer sleeves is in alignment one with one of said stations of the third turret; and
   (iv) the first and second formers being mounted for movement with respect to their respective axes so as to become concentric with a transfer sleeve aligned therewith.

2. A tire building apparatus as claimed in claim 1 wherein at least one anciallary apparatus is positioned peripherally of said third turret and in alignment with one of said stations occupied by said second formers, and the second formers on the third turret are mounted for movement axially with respect to their own axes and radially with respect to the third turret, so as to move into operative alignment with the ancillary apparatus.

3. A tire building apparatus as claimed in claim 2 wherein there are two ancillary apparatus around the periphery of the third turret, said ancillary apparatus each adding more tire components to said cylindrical inner liner to form a tire carcass assembly, and wherein the carcass assembly is retained within one of said ancillary apparatus.

4. Apparatus according to claim 2 wherein the axis of the turrets are vertical and the former axes are horizontal.

5. Apparatus according to claim 1 wherein the turret axes are horizontal.

6. Apparatus according to claim 1 wherein the turret axes are horizontal and the former axis is aligned parallel to the turret axis.

* * * * *